Jan. 20, 1953　　　T. W. PEACOCK ET AL　　　2,625,870
ROOT RAKE SHOE
Filed Nov. 7, 1947
Fig.1
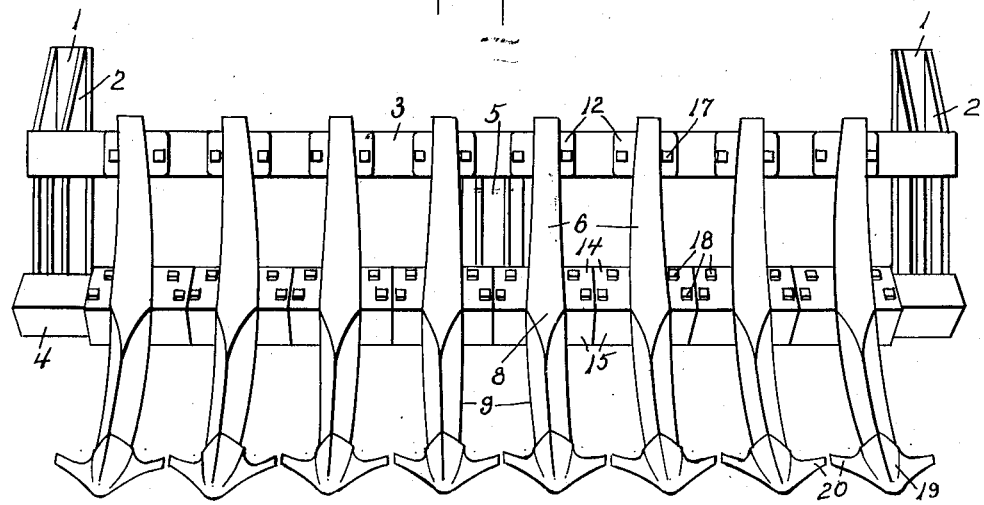
Fig.2　Fig.3　　　　　Fig.4
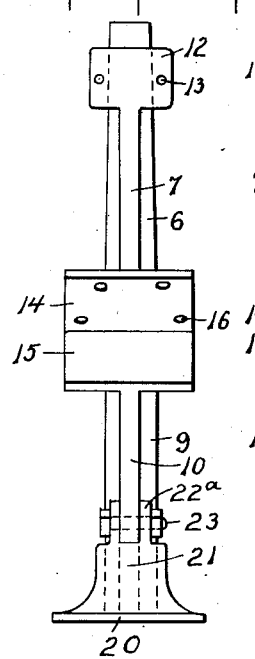
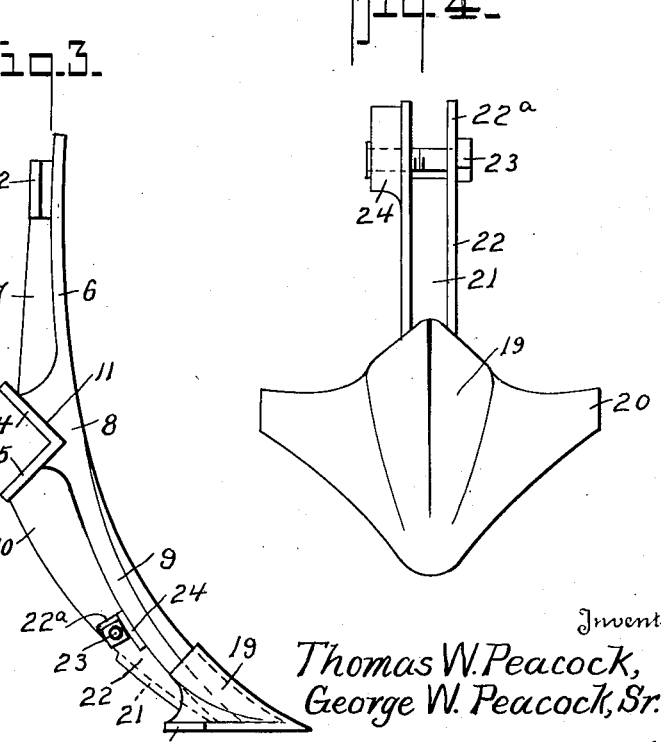
Inventor
Thomas W. Peacock,
George W. Peacock, Sr.,
By Albert E. Dieterich,
Attorney.

Patented Jan. 20, 1953

2,625,870

UNITED STATES PATENT OFFICE 2,625,870

ROOT RAKE SHOE

Thomas W. Peacock and George W. Peacock, Sr., Jacksonville, Fla., assignors, by direct and mesne assignments, to Florida Land Clearing Equipment Company, Jacksonville, Fla., a corporation of Florida Application November 7, 1947, Serial No. 784,576

3 Claims. (Cl. 97—198)

The invention relates to root rakes or grubbers and has for its object to supplement the improvements heretofore made to the rake disclosed in the application of John E. Price and Thomas W. Peacock, Serial No. 634,967, filed December 14, 1945, now Patent No. 2,491,208, dated December 13, 1949.

In our application filed July 25, 1947, Serial No. 763,634, now Patent No. 2,491,058, dated December 13, 1949, we have disclosed and claimed the rake which was an improvement on that of application Serial No. 634,967 and on which the present invention is an attachment to widen its scope of use.

It is the object of the present invention to provide each tooth with a shoe having side wings to pull up anything that would pass between the teeth. The shoes, in practice, are of cast steel alloy and slip over onto the point end of the teeth, provision being made to fasten the shoes in place.

To the attainment of the aforesaid object invention resides in the novel details of construction, combinations and arrangements of parts, all of which shall first fully be described and then be specifically pointed out in the appended claims, reference being had to the accompanying drawing in which:

Fig. 1 is a front perspective view of a root rake embodying my invention.

Fig. 2 is an enlarged rear elevation of a tooth with the shoe attached.

Fig. 3 is a side elevation of the same.

Fig. 4 is an enlarged front elevation of one of the shoes, per se.

In the drawing in which like numerals of reference indicate like parts in all the figures, I represents the side posts or standards of the rake frame which have ribs 2, to which ribs an angle iron bar 3 is securely welded. 4 is a hollow rectangular beam which has one edge welded to the ribs 2 and bars I and on which the seats or saddles of the teeth 8 are secured by cap screws 18. The bars 3 and 4 are braced midway by a vertical flange bar 5 which is securely welded to the bars 3 and 4 (see Fig. 1).

Each tooth of the rake is of the same construction, so a description of one will suffice. The tooth comprises an upper portion 6, an intermediate portion 8 and a lower portion 9. The upper and lower portions have strengthening ribs 7 and 10 respectively at the rear.

The intermediate portion, at the rear, has a right angled seat 11, the faces of which lie at approximately forty-five degrees to the horizontal so as to receive a mounting pad having two parts 14 and 15 which lie at right angles to each other. The upper part 14 is provided with bolt holes 16 for the bolts 18, that secure the pad 14—15 to the beam 4 as shown in Fig. 1. Welded to the rib 7 at its upper end is a second or top mounting pad 12 composed of a flat plate to lie against the vertical face of the angle iron 3 to which the plate is secured by bolts 17 passing through holes 13 in the plate 12 and through registering holes in the angle iron beam 4.

All of the above parts are disclosed in our second mentioned above application and per se are not claimed herein.

Our present invention consists in providing a shoe having a socket portion 19 shaped to fit over the lower or point end of the tooth and provided with side wings 20, the wings of one tooth extending to adjacent those of adjacent teeth and forming an almost continuous root cutter bar from one side of the machine to the other. In addition to the wings 20 parallel side plates 22 project from the socket 19 and lie against the rib 10 of the tooth behind the portion 9 of the tooth, to which rib the extended ends 22ª of the plates 22 are bolted as at 23. The plates 22 are joined, from the socket 19 to adjacent the bolting extensions 22ª, by a web 21, thus forming a channel to receive the rib 10 snugly (see Figs. 2 and 4). One extension 22ª has an ear 24 to be engaged by a flat of the nut to prevent its turning when bolt 23 is screwed home or the bolt may be put in so that the head of the bolt will engage the ear 24 if desired.

By providing the teeth with the shoes as shown and described any roots, etc. that would ordinarily pass between the teeth of the rake will be cut off or pulled up.

Further the shoes may be fitted to teeth whose ends have been worn or chipped as well as to new teeth, if desired.

From the foregoing description, taken in connection with the accompanying drawings, it is thought that the construction, operation and advantages of the invention will readily appear to those skilled in the art.

What we claim is:

1. A root rake comprising a tooth having a rib on its inner surface extending lengthwise thereof, a shoe having a socket for the reception of the lower portions of said tooth and rib, parallel plates connected to said shoe and extending from said socket beneath said tooth and disposed along and in engagement with the sides of said rib, a web connecting said plates together and disposed along the outer edge of said rib, said parallel plates and web forming a channel providing a snug engagement with said rib, and means for securing said plates to said rib and wings extending laterally from the sides of said shoe.

2. A root rake comprising a tooth having a rib on its inner surface extending lengthwise thereof, a shoe having a socket for the reception of the lower portions of said tooth and rib, parallel plates connected to said shoe and extending from said socket beneath said tooth and disposed along and in engagement with the sides of said rib and means for securing said plates to said rib.

3. A root rake comprising a tooth having a rib on its inner surface extending lengthwise thereof, a shoe having a socket for the reception of the lower portions of said tooth and rib, parallel plates connected to said shoe and extending from said socket beneath said tooth and disposed along and in engagement with the sides of said rib, a web connecting said plates together and disposed along the outer edge of said rib, said parallel plates and web forming a channel providing a snug engagement with said rib and means for securing said plates to said rib.

THOMAS W. PEACOCK.
GEORGE W. PEACOCK, Sr.

REFERENCES CITED

The following references are of record in the file of this patent:

UNITED STATES PATENTS

| Number | Name | Date |
| --- | --- | --- |
| 465,422 | Barton | Dec. 15, 1891 |
| 759,086 | Fletcher | May 3, 1904 |
| 941,224 | Bethune | Nov. 23, 1909 |
| 1,299,676 | Campbell | Apr. 8, 1919 |
| 2,491,058 | Peacock et al. | Dec. 13, 1949 |